UNITED STATES PATENT OFFICE 1,943,837

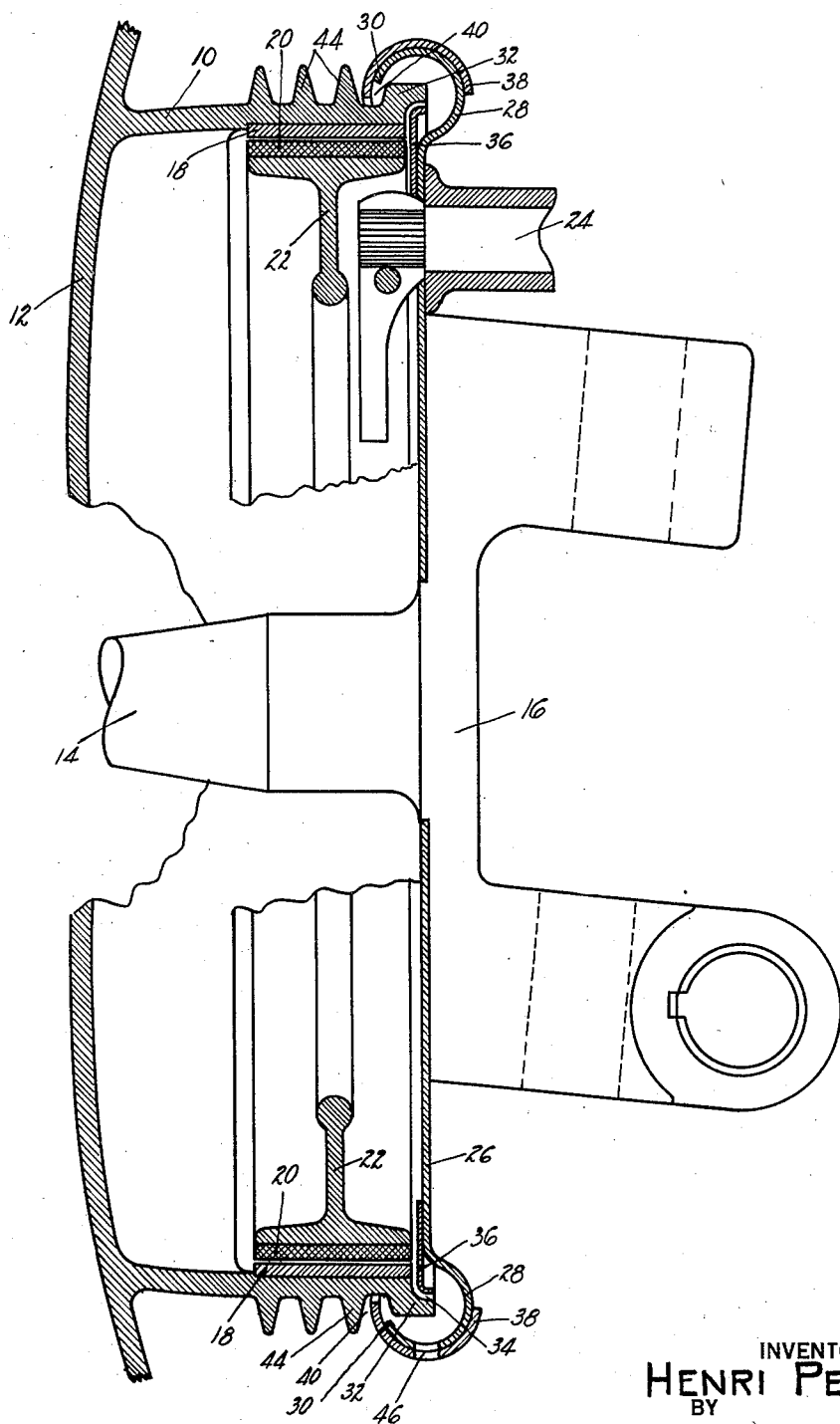

BRAKE DRUM CLOSURE

Henri Perrot, Paris, France, assignor, by mesne assignments, to Bendix Aviation Corporation, Chicago, Ill., a corporation of Delaware Application May 25, 1927, Serial No. 194,228, and in France June 14, 1926

6 Claims. (Cl. 188—218)

In automobile brakes of the internal expanding type the drum is generally closed at its open side by a backing plate or the like, carried by the knuckle or by the axle, and having as an important function the prevention of the entrance inside the drum of water, mud, etc. There is necessarily a certain clearance or tolerance between the brake drum and the backing plate which prevents the drum from being closed perfectly. The present invention has for an important object the improvement of this construction by providing a joint between the rotating drum and the stationary backing plate which is adapted to prevent entirely the passage of any water or mud. Preferably the backing plate is formed at its outer edge with a channel or gutter encircling the edge of the brake drum and preferably also the backing plate is provided with a baffle or deflector having a comparatively close joint with the inside of the brake drum.

In the arrangement shown in the drawing a separate channel member is arranged to encircle the edge of the backing plate, being split at one point so that it may be slipped over the backing plate and welded or otherwise secured to the backing plate. This may be regarded as a continuation of the backing plate itself, and is formed with its edge projecting into a groove on the outside of the brake drum, formed, in the illustrated arrangement, by two ribs or flanges forming part of a series of heat-radiating ribs encircling the drum.

The above and other objects and features of the invention, including various novel and desirable details of construction, will be apparent from the following description of the illustrative embodiments shown in the accompanying drawing, in which:

The figure is a vertical section through part of one front wheel and associated parts, showing the drum and backing plate in vertical section.

In the illustrated embodiment of the invention, the brake drum 10 is an integral part of a cast aluminum wheel 12 rotating on the spindle 14 of a front wheel knuckle 16. The inside of the drum may be provided with a cast iron liner 18 for engagement with the lining 20 of the brake shoes 22. The brake may be operated by any suitable cam or linkage controlled by the usual operating shaft 24. The open side of the drum is closed by a suitable backing plate 26, and the present invention relates to the provision of a substantially water-tight joint between the backing plate 26 and the brake drum 10.

The backing plate 26 is pressed or spun at its periphery to form a channel or gutter 28, the edge of which at 30 is just sufficiently larger than a radial flange or rib 32 at the edge of the brake drum, so that the backing plate may be slipped over the rib 32. The drum is preferably cut out or rabbeted to form a recess 34 forming a very close joint with an annular baffle or deflector plate 36 welded or otherwise secured to the inner face of the backing plate 26 and flanged away from the wheel 12 at its outer edge to form with the recess 34 of the drum a joint facing toward the backing plate 26.

Preferably the backing plate 28 is encircled by a separate channel member 38, which may be split at one point in its circumference so that it may be expanded sufficiently to be put in position after the backing plate and drum are assembled.

The channel member 38 may, if desired, be riveted or welded or otherwise secured to the backing plate 26, although ordinarily it will be held in place sufficiently by its own tension. It is to be especially noted that the edge of the channel member 38 is somewhat smaller in diameter than the diameter of the rib or flange 32 and therefore projects into the groove 40 defined by the rib 32 and an adjacent rib 44 forming one of a series of heat-radiating ribs or flanges on the exterior of the brake drum. Alined openings 46 may be formed in channels 28 and 38 at the bottom of the wheel to drain off any water which may find its way into the space between the backing plate 26 and the deflector 36.

While one illustrative embodiment has been described in detail, it is not my intention to limit the scope of the invention to that particular embodiment or otherwise than by the terms of the appended claims.

I claim:

1. Brake mechanism comprising a brake drum and, in combination therewith, a backing plate formed to provide a joint with both the inside and outside surfaces of the drum.

2. Brake mechanism comprising a brake drum and, in combination therewith, a backing plate having a part at its periphery encircling the end of the brake drum, and a deflector carried by the backing plate and forming a joint with the inside of the brake drum.

3. Brake mechanism comprising a brake drum and, in combination therewith, a backing plate having a part forming a joint with the inside of the drum and another part which encircles the edge of the brake drum.

4. Brake mechanism comprising a brake drum having a rib at its free edge and an exterior rib spaced slightly away from the free edge and having, in combination therewith, a backing plate having at its periphery a portion extending across the first rib and terminating immediately adjacent the second rib.

5. Brake mechanism comprising a brake drum having a groove in its external surface adjacent its free edge and, in combination therewith, a backing plate having a part extending into said groove.

6. Brake mechanism comprising a brake drum and, in combination therewith, a backing plate at the open side of the drum having a part forming a joint with the inner surface of the drum and another part forming a comparatively close joint with the external surface of the drum.

HENRI PERROT.